(12) United States Patent
Cheong

(10) Patent No.: US 6,339,517 B1
(45) Date of Patent: Jan. 15, 2002

(54) DUST REMOVING APPARATUS FOR DISK DRIVE

(75) Inventor: Young-Min Cheong, Seoul (KR)

(73) Assignee: SamSung Electronics Co., Ltd., Suwon (KR)

(*) Notice: Subject to any disclaimer, the term of this patent is extended or adjusted under 35 U.S.C. 154(b) by 0 days.

(21) Appl. No.: 09/324,112

(22) Filed: Jun. 2, 1999

(30) Foreign Application Priority Data

Jun. 2, 1998 (KR) .......................................... 1998-20393

(51) Int. Cl.[7] .................................................. G11B 3/58
(52) U.S. Cl. .................................................... 360/128
(58) Field of Search ............................ 360/128, 264.4, 360/264.3, 264.1; 369/75, 71, 72, 219

(56) References Cited

U.S. PATENT DOCUMENTS

| | | | | |
|---|---|---|---|---|
| 3,797,034 A | * | 3/1974 | Weidanz et al. | 360/88 |
| 4,408,238 A | * | 10/1983 | Hearn | 360/104 |
| 4,835,808 A | * | 6/1989 | Hahne et al. | 15/1.5 R |
| 5,247,416 A | * | 9/1993 | Shiba et al. | 360/133 |
| 5,274,511 A | * | 12/1993 | Ikeda | 360/55 |
| 5,461,521 A | * | 10/1995 | Ito et al. | 360/75 |
| 5,831,792 A | * | 11/1998 | Ananth | 360/263.3 |

FOREIGN PATENT DOCUMENTS

| | | | |
|---|---|---|---|
| JP | 59-148155 | * | 8/1984 |
| JP | 63-211120 | * | 9/1988 |
| JP | 1-149211 | * | 6/1989 |

* cited by examiner

Primary Examiner—Hoa T. Nguyen
Assistant Examiner—Tianjie Chen
(74) Attorney, Agent, or Firm—Robert E. Bushnell, Esq.

(57) ABSTRACT

In a dust removing apparatus associated with a disk drive for removing dust existing on a disk (a recording medium), impurities on the disk are removed by a dust removing slider using a high voltage and a difference in air pressure, so that a head is prevented from shaking due to impurities existing on the disk while data are recorded on or reproduced from the disk. As a result, a tracking servo can be stabilized. Basically, the dust removing apparatus comprises an AC-to-DC high voltage conversion transducer and a conductive plate for collecting impurities ionized by the transducer.

27 Claims, 6 Drawing Sheets

DUST REMOVING APPARATUS FOR DISK DRIVE

CLAIM OF PRIORITY

This application makes reference to, incorporates the same herein, and claims all benefits accruing under 35 U.S.C. §119 from my application DUST REMOVING APPARATUS OF DISK DRIVE filed with the Korean Industrial Property Office on Jun. 2, 1998 and there duly assigned Ser. No. 20393/1998.

BACKGROUND OF THE INVENTION

1. Technical Field

The present invention relates to a disk drive and, more particularly, to a dust removing apparatus for removing dust from the surface of a disk as a recording medium, driven by the a disk drive.

2. Related Art

A hard disc drive, as a disk recording/reproducing apparatus, reproduces predetermined data recorded on a disk using a magnetic head, or records new data on the disk, thereby contributing to the operation of a computer system. The density of such a hard disk drive increases in the rotating direction of the disk, as measured in bits per inch (BPI), and in the thickness direction thereof, as measured in tracks per inch (TPI). Moreover, the aforementioned densities increase as the capacity and density of the hard disk drive increases and as the hard disk drive becomes smaller in size. Accordingly, a more accurate and rapid method for controlling the position of a head, and an elaborate mechanism are required.

In a general magnetic head constituting a hard disk drive, a magnetic field is formed around a conductor when a current flows through a coil wound around the conductor, and the direction and intensity of the magnetic field are determined by the direction and magnitude of the current. The magnetic head forms a minute gap in a ring-shaped conductor (core), and, when the core is wound by a coil and current flows into the coil, a strong leakage magnetic flux is generated around the gap. The leakage magnetic flux changes the direction of the magnetic particles of a recording medium into a predetermined direction according to the direction of the current, and this is called "writing". Conversely, a process in which a magnetically recorded signal is induced as an electrical signal is called "reading".

These are basic characteristics of a magnetic head, and magnetic heads are classified into various types according to the recording method and the properties of the magnetic head material.

The recording method is roughly divided into horizontal writing on a magnetic disk and vertical writing thereon. Generally, a hard disk drive uses the horizontal writing method in which a magnetic head reads from or writes to a rotating magnetic disk while being levitated a predetermined distance above the disk. The magnetic head is becoming miniaturized for high performance, high quality, and high density writing of information.

In particular, to increase the recording density of a disk recording/reproducing apparatus, the flying height (the interval between a head and a disk during driving) should be lowered as much as possible. Accordingly, a recent optical magnetic recording/reproducing apparatus and a magnetic recording/reproducing apparatus reduce the flying height of a head slider as much as possible by using a super-near, non-contact recording technique and a near contact recording technique, respectively.

However, when impurities infiltrate into the flying height area with the head slider having a lowered flying height, the head slider directly disperses the impurities. Therefore, the head trembles during recording/reproduction, thus making a tracking servo unstable, and having a fatal effect on the performance of the drive.

SUMMARY OF THE INVENTION

To solve the above problems, it is an objective of the present invention to provide a dust removing apparatus associated with a disk drive for removing dust on a recording medium using an atmospheric stream due to a difference in pressure, and using an electrostatic force.

Accordingly, to achieve the above objective, there is provided a dust removing apparatus for a disk drive including ahead slider, the apparatus comprising: an AC-to-DC high voltage conversion transducer for ionizing impurities on the disk; and a conductive plate for collecting ionized impurities using the AC-to-DC high voltage conversion transducer.

It is preferable that a wire connected to the AC-to-DC high voltage conversion transducer be installed on a leading edge, and that the conductive plate be loaded on a trailing edge.

Preferably, air enters via the leading edge during rotation of the disk, and entered air flows out via the trailing edge.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
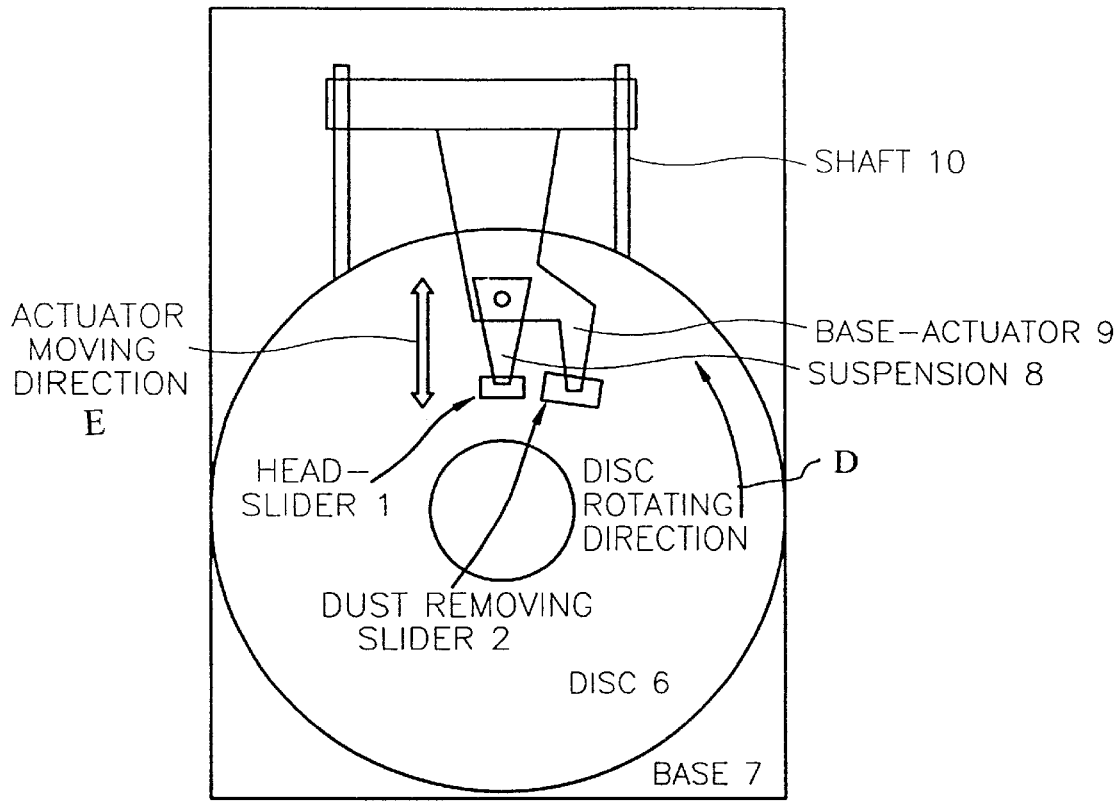
FIG. 1 is a configuration view of a disk drive adopting a dust removing apparatus according to the present invention.
Figure 2:
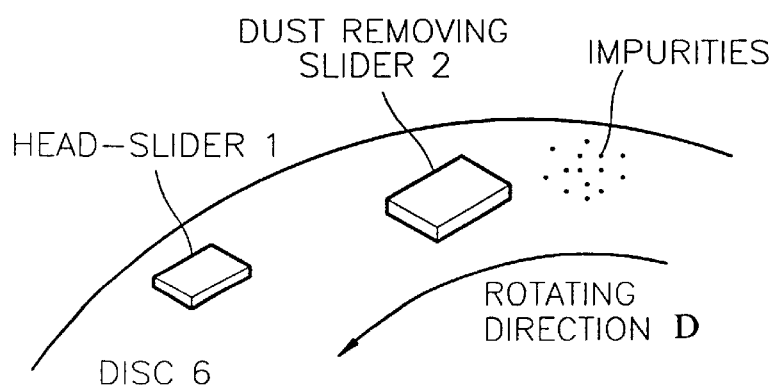
FIG. 2 is a schematic view illustrating the operation of the dust removing slider of FIG. 1.
Figure 3:
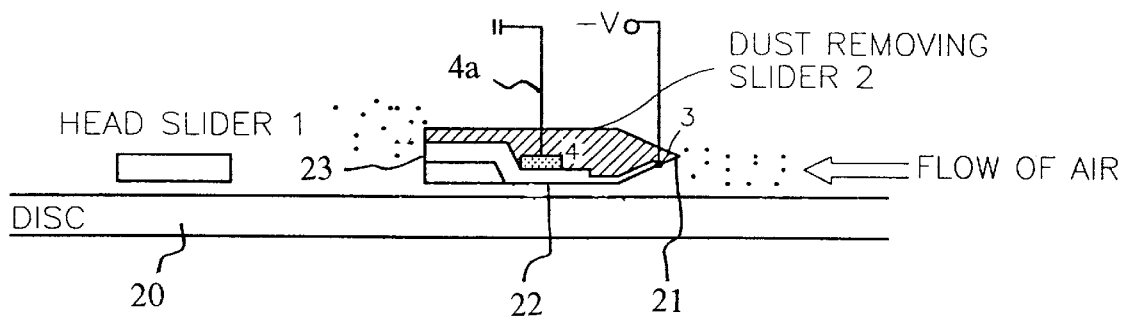
FIG. 3 is a side view of a dust removing apparatus for a disk drive according to the present invention.

FIG. 1 is a configuration view of a disk drive adopting a dust removing apparatus according to the present invention, and FIG. 2 is a schematic view illustrating the operation of the dust removing slider of FIG. 1.

Referring to FIGS. 1 and 2, a disk drive has a base 7 on which a shaft 10 is mounted, and a suspension 8 extending from the shaft 10 so that a head slider 1, located at a distal end of the suspension 8, contacts a disk 6 rotating in the direction indicated by arrow D in FIG. 1. During operation, suspension 8 moves back and forth as indicated by arrow E so that head slider 1 can access any of the tracks on disk 6.

In accordance with the invention, a dust removing slider 2 is disposed on a distal end of a base-actuator 9 operatively associated with and/or linked with suspension 8. In this way, dust removing slider 2 encounters impurities on disk 6 during rotation of disk 6 in direction D, and removes the impurities prior to their reaching head slider 1.

Referring to FIGS. 3, 4A, 4B and 5, a dust eliminating apparatus for a disk drive according to the present invention includes a tungsten wire 3 connected to an AC-to-DC high voltage conversion transducer 5 (see FIG. 5), and an aluminum electrode plate 4 connected to a ground wire 4a. The tungsten wire 3 is installed on a leading edge 21 into which air flows when disk 20 rotates, and the aluminum electrode plate 4 can be installed on a trailing edge 23 or on the center 22 of a corridor, but is preferably installed on the upper portion of the center 22 of the corridor where air flows, in an embodiment of the present invention. The leading edge 21 and the trailing edge 23 are connected through a tunnel (not shown).

Figure 4A:
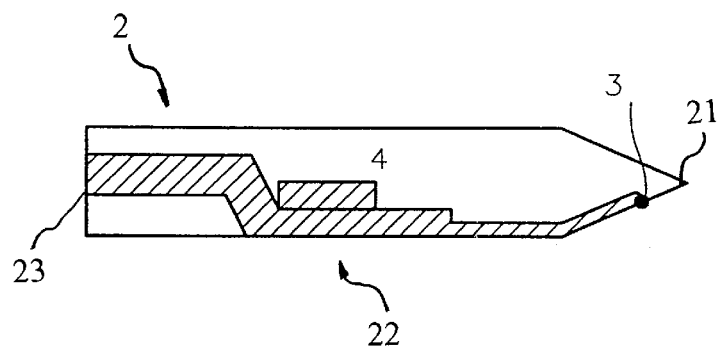
FIG. 4A is a detailed side view of the dust removing slider of FIG. 3.

The interior of the dust removing slider 2, indicated by a hatched portion of FIG. 4A, is made of a dielectric.

In order to smooth the flow of air due to a difference in pressure, the cross-section of the center 22 (FIG. 4B) of a passage through which air flows is larger than that of the leading edge 21 of the air flow passage, and the cross-section of the trailing edge 23 of the air flow passage is larger than that of the center 22 of the air flow passage.

Figure 6A:
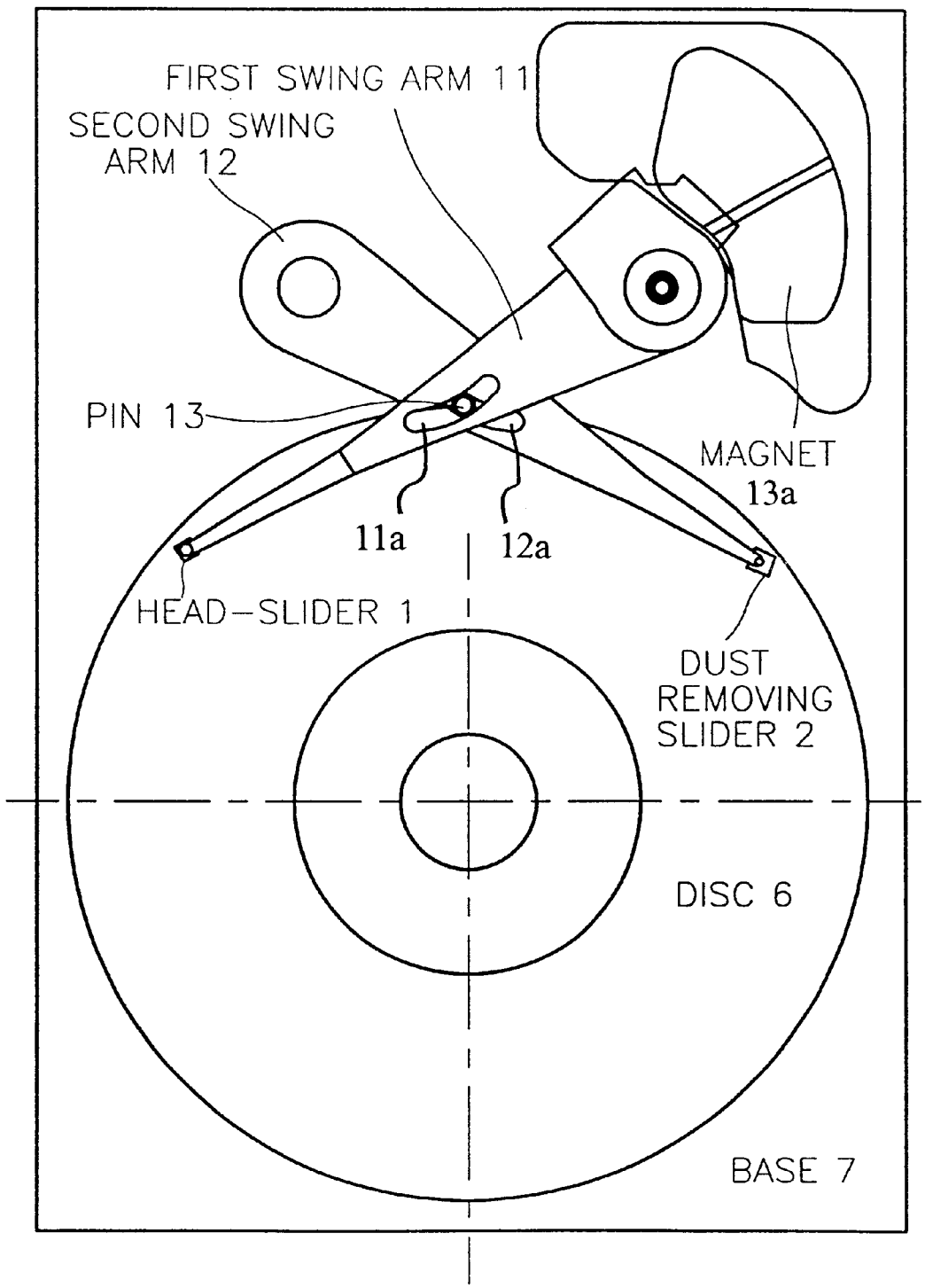
FIGS. 6A and 6B are configuration views of a disk drive adopting a dust removing apparatus according to the present invention.
Figure 6B:
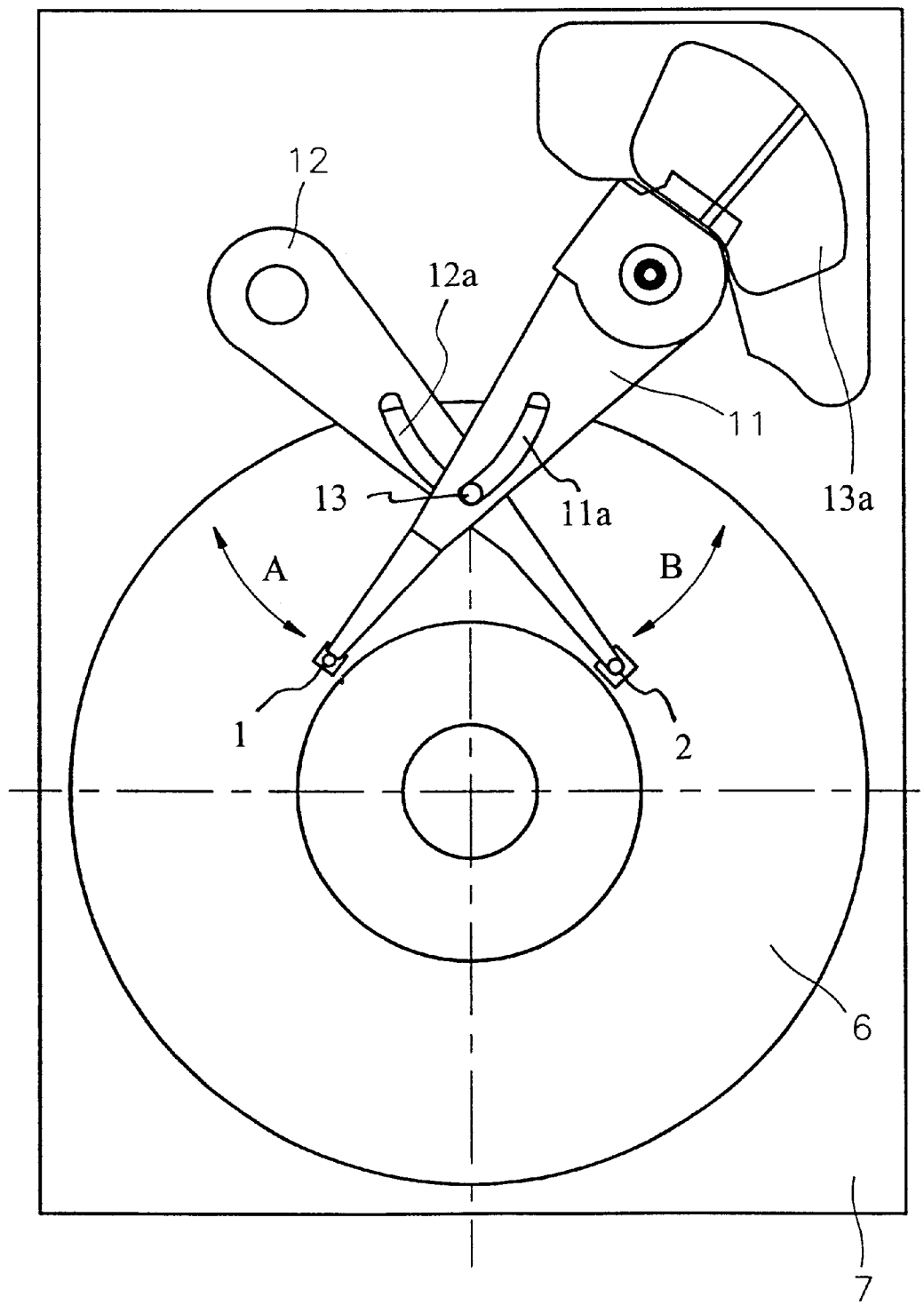
Figure 7:
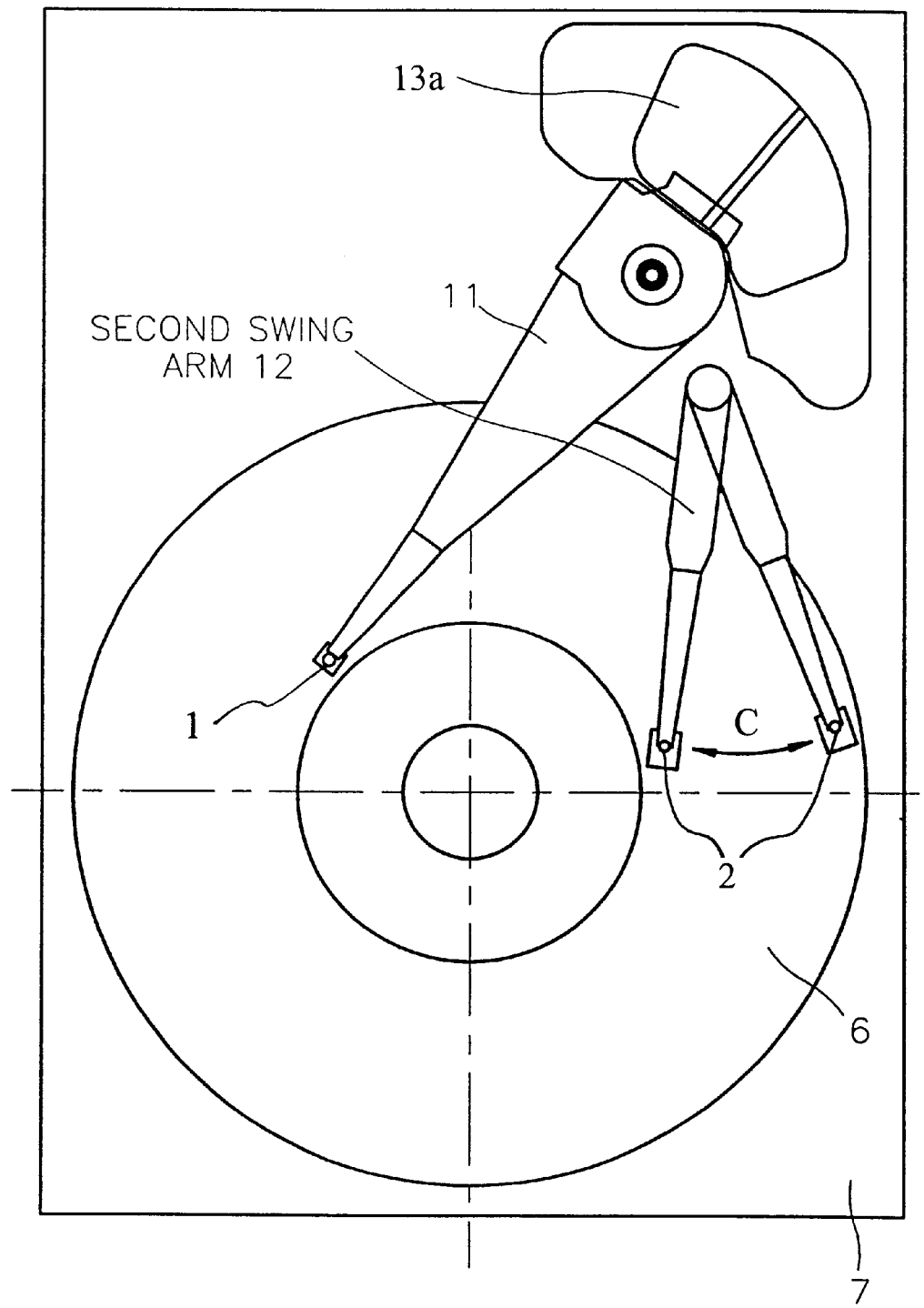
FIG. 7 is a configuration view of a disk drive adopting another embodiment of a dust removing apparatus according to the present invention.

The dust removing slider having such a configuration is applied to a disk drive as shown in FIGS. 6A, 6B, or 7, and can remove dust from the surface of a disk 6.

In FIGS. 6A and 6B, dust removing slider 2 and head slider 1 are connected to each other by means of a pin 13 disposed in the holes of first swing arm 11 and second swing arm 12, respectively, and move in engagement with each other (see arrows A and B in FIG. 6B), thereby removing dust existing on a disk 6. In FIG. 7, the dust removing slider 2 has a structure for removing dust on the disk 6 while moving along a track (see arrow C in FIG. 7) by the second swing arm 12 independently of the head slider 1.

FIG. 6A shows the case wherein the dust removing slider 2 is disposed on the outermost circumference of a track of disk 6 in engagement with the head slider 1 via the first swing arm 11 which moves the head slider 1.

FIG. 6B shows the case wherein dust removing slider 2 is disposed on the innermost circumference of a track of disk 6 according to the movement of head slider 1.

In these cases, the position of the pin 13 and the position of the holes 11a and 12a must be determined so that the head slider 1 and the dust removing slider 2 are always disposed on the same track.

The operation by which impurities are removed by the dust removing apparatus for a disk drive according to the present invention when a disk rotates will now be described.

When the dust removing slider 2 moves in engagement with the head slider 1 under the control of magnet 1 3a as shown in FIGS. 6A and 6B, dust removing slider 2 is placed before the head slider 1 during rotation of the disk 6 (see arrow D) as shown in FIG. 2. Thus, when foreign matter (such as dust) exists on the disk 6, the dust removing slider 2 comes into contact with foreign matter, (such as dust) before coming near the head slider 1.

Figure 5:
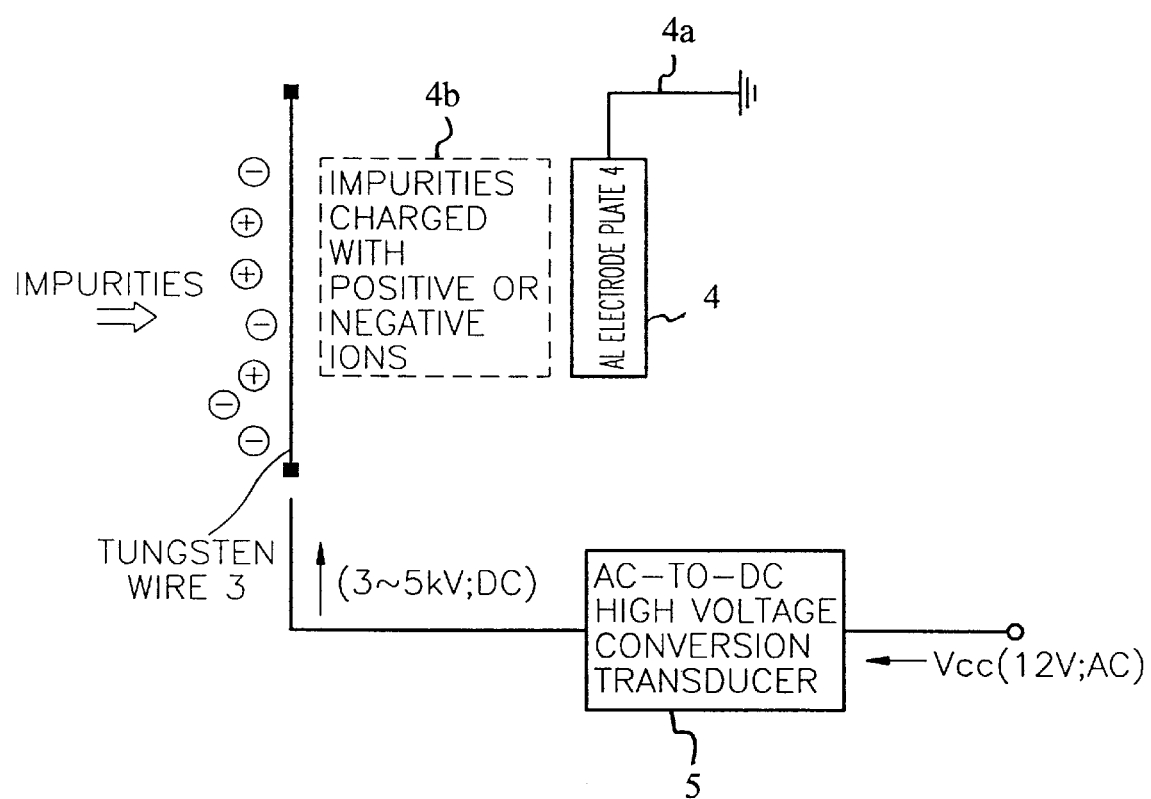
FIG. 5 is a schematic view illustrating the ionization of impurities when a high voltage is applied to a tungsten wire shown in FIG. 3.

At this point, impurities in the air are introduced to a high voltage of the tungsten wire 3 placed on the leading edge 21 of the dust removing slider 2, and are ionized as indicated by block 4b in FIG. 5.

Figure 4B:
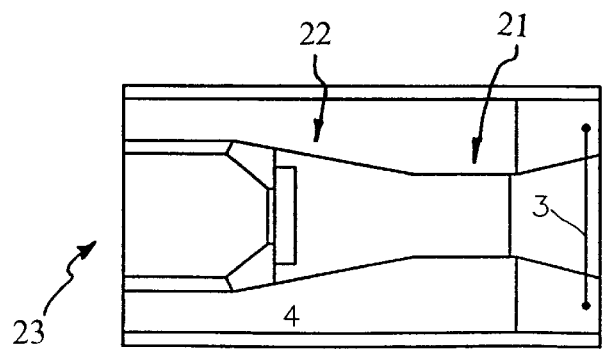
FIG. 4B is a detailed plan view of the dust removing slider of FIG. 3.

Thus, referring to FIGS. 4A and 4B, impurities in the air entering through a passage of the leading edge 21 are ionized. The air and the ionized impurities are then moved to the center 22 of a corridor, whose cross-section is wider than that of the leading edge 21, due to a difference in pressure. Then, the grounded aluminum electrode plate 4 disposed on the upper portion of the center 22 attracts and collects ionized impurities included in the introduced air using the force of an electrostatic field. In particular, the center 22 of the hole on which the aluminum electrode plate 4 is attached is higher than the leading edge 21 such that impurities in the air can rise toward the upper surface of the hole. After the ionized impurities are collected by the aluminum electrode plate 4 disposed on the center 22 of the hole, air entering the center 22 of the hole escapes to a point where the air pressure is relatively low, via the hole of the trailing edge 23, since the air within the center 22 of the hole has a higher air pressure than outside the hole.

Therefore, impurities in the air entering into the leading edge 21 are ionized and collected, while only air containing no impurities flows out of the trailing edge 23. In this way, dust on the disk 6 is removed.

According to the present invention as described above, impurities on a disk are eliminated by a dust removing slider using a high voltage and a difference in air pressure, so that the head is prevented from shaking due to impurities existing on the disk while data is recorded/reproduced in/from the disk. Therefore, a tracking servo can be stabilized.

What is claimed is:

1. A dust removing apparatus for a disk drive which includes a head slider, the apparatus comprising:
    an AC-to-DC high voltage conversion transducer for ionizing impurities on a disk so as to produce ionized impurities;
    a wire connected to the AC-to-DC high voltage conversion transducer and installed on a leading edge of said apparatus; and
    a conductive plate disposed on a trailing edge of said apparatus for collecting the ionized impurities.

2. The dust removing apparatus as claimed in claim 1, wherein air enters via the leading edge during rotation of the disk, and the entered air flows out via the trailing edge.

3. The dust removing apparatus as claimed in claim 2, wherein a cross-section of an air exit passage at the trailing edge is larger than a cross-section of an air entrance passage at the leading edge.

4. The dust removing apparatus as claimed in claim 3, wherein the conductive plate is disposed on an upper portion of the trailing edge, and a center of air flow in the air exit passage at the trailing edge is higher than a center of air flow in the air entrance passage at the leading edge.

5. The dust removing apparatus as claimed in claim 1, wherein a cross-section of an air exit passage at the trailing edge is larger than a cross-section of an air entrance passage at the leading edge.

6. The dust removing apparatus as claimed in claim 5, wherein the conductive plate is disposed on an upper portion of the trailing edge, and a center of air flow in the air exit passage at the trailing edge is higher than a center of air flow in the air entrance passage at the leading edge.

7. The dust removing apparatus as claimed in claim 1, wherein said apparatus comprises a dust removing slider on which said conductive plate is disposed, and dust removing slider moving means for moving said dust removing slider; and
    where said dust removing slider moving means comprises a swing arm and a connecting pin for engaging movement of the swing arm with movement of the head slider by head slider moving means.

8. The dust removing apparatus as claimed in claim 7, wherein said head slider moving means comprises a further swing arm, and wherein the connecting pin is installed in respective slots of the swing arm and the further swing arm, whereby the head slider and the dust removing slider are positioned on the same track along a path of movement of the further swing arm.

9. A dust removing apparatus for a disk drive which includes a head slider, said apparatus comprising:
   a first swing arm for moving the head slider;
   a dust removing slider for removing dust on a disk;
   a second swing arm for moving the dust removing slider; and
   a connecting pin for engaging movement of the first swing arm with movement of the second swing arm.

10. The dust removing apparatus as claimed in claim 9, wherein the connecting pin is installed in respective slots of the first and second swing arms, whereby the head slider and the dust removing slider are positioned on the same track along a path of movement of the first swing arm.

11. An apparatus for removing dust from a disk on a disk drive including a head slider, the apparatus comprising:
   transducer means for ionizing impurities on the disk to produce ionized impurities; and
   a conductive plate for collecting the ionized impurities;
   said apparatus further comprising a wire connected to the transducer means and installed on a leading edge of the apparatus, the conductive plate being disposed on a trailing edge of the apparatus.

12. The apparatus as claimed in claim 11, wherein air enters via the leading edge during rotation of the disk, and the entered air flows out via the trailing edge.

13. The apparatus as claimed in claim 12, further comprising an air exit passage at the trailing edge and an air entrance passage at the leading edge, wherein a cross-section of the air exit passage is larger than a cross-section of the air entrance passage.

14. The apparatus as claimed in claim 13, wherein the conductive plate is installed on an upper portion of the trailing edge, and a center of air flow in the air exit passage is higher than a center of air flow in the air entrance passage.

15. The apparatus as claimed in claim 11, further comprising an air exit passage at the trailing edge and an air entrance passage at the leading edge, wherein a cross-section of the air exit passage is larger than a cross-section of the air entrance passage.

16. The apparatus as claimed in claim 15, wherein the conductive plate is installed on an upper portion of the trailing edge, and a center of air flow in the air exit passage is higher than a center of air flow in the air entrance passage.

17. An apparatus for removing dust from a disk drive which includes a head slider and head slider moving means for moving the head slider relative to a disk mounted on the disk drive, said apparatus comprising:
   a dust removing slider; and
   dust removing slider moving means for moving said dust removing slider;
   wherein said dust removing slider is moved into a position to intercept impurities on said disk prior to said head slider encountering said impurities;
   wherein said dust removing slider comprises an AC-to-DC high voltage conversion transducer for ionizing impurities on a disk so as to produce ionized impurities, and a conductive plate disposed on a trailing edge of said dust removing slider for collecting the ionized impurities.

18. The apparatus of claim 17, wherein said dust removing slider further comprises a wire connected to the AC-to-DC high voltage conversion transducer and installed on a leading edge of said dust removing slider.

19. The apparatus of claim 18, wherein air enters via the leading edge during rotation of the disk, and the entered air flows out via the trailing edge.

20. The apparatus of claim 19, wherein a cross-section of an air exit passage at the trailing edge is larger than a cross-section of an air entrance passage at the leading edge.

21. The apparatus of claim 20, wherein the conductive plate is disposed on an upper portion of the trailing edge, and a center of air flow in the air exit passage at the trailing edge is higher than a center of air flow in the air entrance passage at the leading edge.

22. The apparatus of claim 18, wherein a cross-section of an air exit passage at the trailing edge is larger than a cross-section of an air entrance passage at the leading edge.

23. The apparatus of claim 22, wherein the conductive plate is disposed on an upper portion of the trailing edge, and a center of air flow in the air exit passage at the trailing edge is higher than a center of air flow in the air entrance passage at the leading edge.

24. An apparatus for removing dust from a disk drive which includes a head slider and head slider moving means for moving the head slider relative to a disk mounted on the disk drive, said apparatus comprising:
   a dust removing slider; and
   dust removing slider moving means for moving said dust removing slider;
   wherein said dust removing slider is moved into a position to intercept impurities on said disk prior to said head slider encountering said impurities; and
   wherein said dust removing slider moving means comprises a swing arm and a connecting pin for engaging movement of the swing arm with movement of the head slider by said head slider moving means.

25. The apparatus of claim 24, wherein said head slider moving means comprises a further swing arm, and wherein the connecting pin is installed in respective slots of the swing arm and the further swing arm, whereby the head slider and the dust removing slider are positioned on the same track along a path of movement of the further swing arm.

26. An apparatus for removing dust from a disk on a disk drive including a head slider, the apparatus comprising:
   transducer means for ionizing impurities on the disk to produce ionized impurities; and
   a conductive plate for collecting the ionized impurities;
   wherein said apparatus comprises a dust removing slider on which said conductive plate is disposed, and dust removing slider moving means for moving said dust removing slider; and
   wherein said dust removing slider moving means comprises a swing arm and a connecting pin for engaging movement of the swing arm with movement of the head slider by said head slider moving means.

27. The dust moving apparatus as claimed in claim 26, wherein said head slider moving means comprises a further swing arm, and wherein the connecting pin is installed in respective slots of the swing arm and the further swing arm, whereby the head slider and the dust removing slider are positioned on the same track along a path of movement of the further swing arm.

* * * * *